(12) United States Patent
Young et al.

(10) Patent No.: US 12,033,147 B2
(45) Date of Patent: Jul. 9, 2024

(54) SYSTEM FOR CONTAINERIZATION OF NON-FUNGIBLE TOKENS

(71) Applicant: BANK OF AMERICA CORPORATION, Charlotte, NC (US)

(72) Inventors: Michael Robert Young, Davidson, NC (US); Manu Jacob Kurian, Dallas, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 120 days.

(21) Appl. No.: 17/479,171

(22) Filed: Sep. 20, 2021

(65) Prior Publication Data

US 2023/0093520 A1    Mar. 23, 2023

(51) Int. Cl.
*G06Q 20/38* (2012.01)
*G06F 16/23* (2019.01)

(52) U.S. Cl.
CPC ....... *G06Q 20/389* (2013.01); *G06F 16/2379* (2019.01)

(58) Field of Classification Search
CPC .......................... G06Q 20/389; G06F 16/2379
USPC .......................................................... 705/35
See application file for complete search history.

(56) References Cited

U.S. PATENT DOCUMENTS

| | | | |
|---|---|---|---|
| 5,550,976 A | 8/1996 | Henderson et al. | |
| 9,397,985 B1 | 7/2016 | Seger, II et al. | |
| 9,569,771 B2 | 2/2017 | Lesavich et al. | |
| 11,301,463 B1* | 4/2022 | Gauvreau, Jr. | G06F 16/9024 |
| 11,443,838 B1* | 9/2022 | Cordonnier | G16H 10/60 |
| 2005/0038732 A1 | 2/2005 | Sweeting et al. | |
| 2005/0204128 A1 | 9/2005 | Aday et al. | |
| 2006/0265259 A1 | 11/2006 | Diana et al. | |
| 2007/0129958 A1 | 6/2007 | Wu et al. | |
| 2009/0182667 A1 | 7/2009 | Parkes et al. | |
| 2011/0022494 A1* | 1/2011 | Lutnick | G06Q 30/0607 705/26.25 |
| 2014/0156534 A1 | 6/2014 | Quigley et al. | |
| 2015/0262176 A1 | 9/2015 | Langschaedel et al. | |
| 2016/0210710 A1 | 7/2016 | Glennon | |
| 2016/0342994 A1 | 11/2016 | Davis | |
| 2016/0379013 A1 | 12/2016 | Ganesan et al. | |
| 2017/0005804 A1 | 1/2017 | Zinder | |
| 2017/0017954 A1 | 1/2017 | McDonough et al. | |
| 2017/0046689 A1 | 2/2017 | Lohe et al. | |
| 2017/0046698 A1 | 2/2017 | Haldenby et al. | |
| 2017/0075941 A1 | 3/2017 | Finlow-Bates | |

(Continued)

*Primary Examiner* — Mohammad Z Shaikh
*Assistant Examiner* — Michael J Warden
(74) *Attorney, Agent, or Firm* — Moore & Van Allen PLLC; Anup Shrinivasan Iyer

(57) ABSTRACT

Systems, computer program products, and methods are described herein for containerization of non-fungible tokens (NFTs). The present invention is configured to electronically receive, from a computing device of a first user, a request for a containerized non-fungible token (NFT) for at least two resources; initiate a non-fungible token (NFT) generator on the at least two resources in response to receiving the request; extract resource information from the at least two resources; generate, using the NFT generator, the containerized NFT for the at least two resources, wherein the NFT comprises at least the resource information extracted from the at least two resources; and record the containerized NFT on a distributed ledger.

17 Claims, 3 Drawing Sheets

(56) References Cited

U.S. PATENT DOCUMENTS

| | | |
|---|---|---|
| 2017/0085555 A1 | 3/2017 | Bisikalo et al. |
| 2017/0104731 A1* | 4/2017 | Baudoin et al. |
| 2017/0178236 A1* | 6/2017 | Saigh .................... G06Q 40/04 |
| 2019/0366475 A1 | 12/2019 | Scarselli et al. |
| 2020/0242105 A1 | 7/2020 | Rich et al. |
| 2021/0082051 A1* | 3/2021 | Moses ..................... G06F 9/451 |
| 2021/0097508 A1 | 4/2021 | Papanikolas |
| 2021/0279305 A1* | 9/2021 | Goldston .............. G06F 3/0481 |
| 2022/0198034 A1* | 6/2022 | Rodriguez ................ H04L 9/30 |
| 2022/0240434 A1* | 8/2022 | Rice ...................... B65G 65/00 |
| 2022/0278967 A1* | 9/2022 | Glassco ............. H04L 63/0407 |
| 2022/0300950 A1* | 9/2022 | Yakovlev ............... G06Q 20/02 |
| 2022/0309491 A1* | 9/2022 | Shapiro ................... G06F 21/64 |
| 2022/0366022 A1* | 11/2022 | Goldston ............... G06F 16/61 |
| 2022/0374503 A1* | 11/2022 | Goldston ............. G06F 3/0481 |
| 2022/0383295 A1* | 12/2022 | Cox ................... G06Q 20/3278 |
| 2022/0391898 A1* | 12/2022 | Castinado ........ G06Q 20/38215 |
| 2022/0398340 A1* | 12/2022 | Jakobsson ............. G06F 21/602 |
| 2023/0009622 A1* | 1/2023 | Castinado ............. G06F 9/5005 |
| 2023/0009908 A1* | 1/2023 | Castinado ............. H04L 9/0819 |
| 2023/0017499 A1* | 1/2023 | Agrawal ................ G06N 20/00 |
| 2023/0045120 A1* | 2/2023 | Masherah .............. G06Q 40/04 |
| 2023/0063245 A1* | 3/2023 | Young .................. H04L 9/3247 |
| 2023/0063408 A1* | 3/2023 | Young ................. G06Q 20/389 |
| 2023/0070586 A1* | 3/2023 | Kapur ................. G06Q 20/123 |
| 2023/0070674 A1* | 3/2023 | Greenbacker ........ G06Q 20/401 |
| 2023/0073545 A1* | 3/2023 | Kurian ................ G06Q 20/401 |
| 2023/0073859 A1* | 3/2023 | Matthews .......... G06Q 30/0641 |
| 2023/0077278 A1* | 3/2023 | Goncalves ......... G06Q 30/0631 |
| 2023/0092012 A1* | 3/2023 | Matthews .......... G06Q 20/0658 |
| 2024/0073021 A1* | 2/2024 | Young ................. G06Q 20/389 |

\* cited by examiner

SYSTEM FOR CONTAINERIZATION OF NON-FUNGIBLE TOKENS

FIELD OF THE INVENTION

The present invention embraces a system for containerization of non-fungible tokens (NFTs).

BACKGROUND

An NFT is a digital unit of data used as a unique digital identifier for a resource. An NFT is typically stored on a distributed ledger that certifies ownership and authenticity of the resource. An NFT, similar to the resource that it represents, can be bought, and sold either wholly, in portions, or combined with other similar NFTs to be sold as a container. In some cases, each container may be divided into multiple portions and sold in the marketplace. To achieve this, there is a need for a system for containerization of NFTs.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for containerization of non-fungible tokens (NFTs) is presented. The system comprising: at least one non-transitory storage device; and at least one processing device coupled to the at least one non-transitory storage device, wherein the at least one processing device is configured to: electronically receive, from a computing device of a first user, a request for a containerized non-fungible token (NFT) for at least two resources; initiate a non-fungible token (NFT) generator on the at least two resources in response to receiving the request; extract resource information from the at least two resources; generate, using the NFT generator, the containerized NFT for the at least two resources, wherein the NFT comprises at least the resource information extracted from the at least two resources; and record the containerized NFT on a distributed ledger.

In some embodiments, extracting the resource information further comprises retrieving an NFT associated with each of the at least two resources; and retrieving, from a first metadata layer of the NFT associated with each of the at least two resources, the resource information.

In some embodiments, the resource information comprises at least a value and ownership information associated with each of the at least two resources.

In some embodiments, the at least one processing device is further configured to: determine, using an NFT valuation engine, a value for the containerized NFT, wherein the value for the containerized NFT is based on at least the value and ownership information associated with the at least two resources.

In some embodiments, the at least one processing device is further configured to: generate, using the NFT generator, a first metadata layer for the containerized NFT; and store the value of the containerized NFT in the first metadata layer of the containerized NFT.

In some embodiments, the at least one processing device is further configured to: electronically receive, from the computing device of the first user, a request to containerize an additional resource with the at least two resources; extract resource information from the additional resource in response to receiving the request; generate, using the NFT generator, a new containerized NFT for the at least two resources and the additional resource, wherein the NFT comprises at least the resource information extracted from the at least two resources and the additional resource; and record the new containerized NFT on the distributed ledger.

In some embodiments, extracting the resource information from the additional resource further comprises: retrieving an NFT associated with the additional resource; and retrieving, from a first metadata layer of the NFT associated with the additional resource, the resource information.

In another aspect, a method for containerization of non-fungible tokens (NFTs) is presented. The method comprising: electronically receiving, from a computing device of a first user, a request for a containerized non-fungible token (NFT) for at least two resources; initiating a non-fungible token (NFT) generator on the at least two resources in response to receiving the request; extracting resource information from the at least two resources; generating, using the NFT generator, the containerized NFT for the at least two resources, wherein the NFT comprises at least the resource information extracted from the at least two resources; and recording the containerized NFT on a distributed ledger.

In yet another aspect, a computer program product for containerization of non-fungible tokens (NFTs) is presented. The computer program product comprising a non-transitory computer-readable medium comprising code causing a first apparatus to: electronically receive, from a computing device of a first user, a request for a containerized non-fungible token (NFT) for at least two resources; initiate a non-fungible token (NFT) generator on the at least two resources in response to receiving the request; extract resource information from the at least two resources; generate, using the NFT generator, the containerized NFT for the at least two resources, wherein the NFT comprises at least the resource information extracted from the at least two resources; and record the containerized NFT on a distributed ledger.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
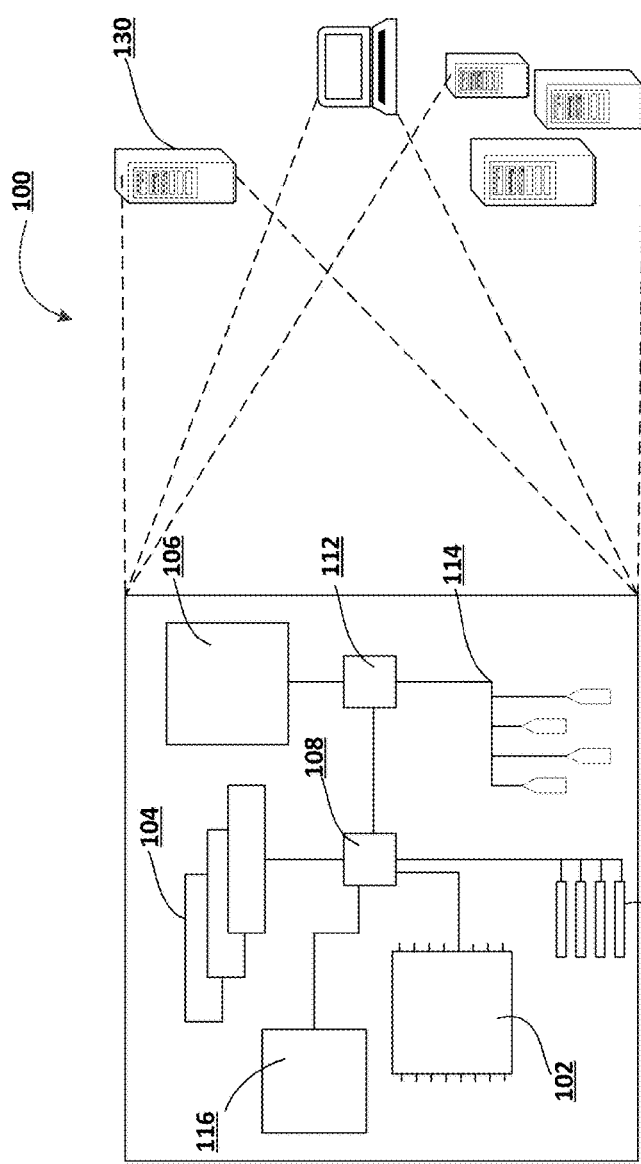
Figure 1:
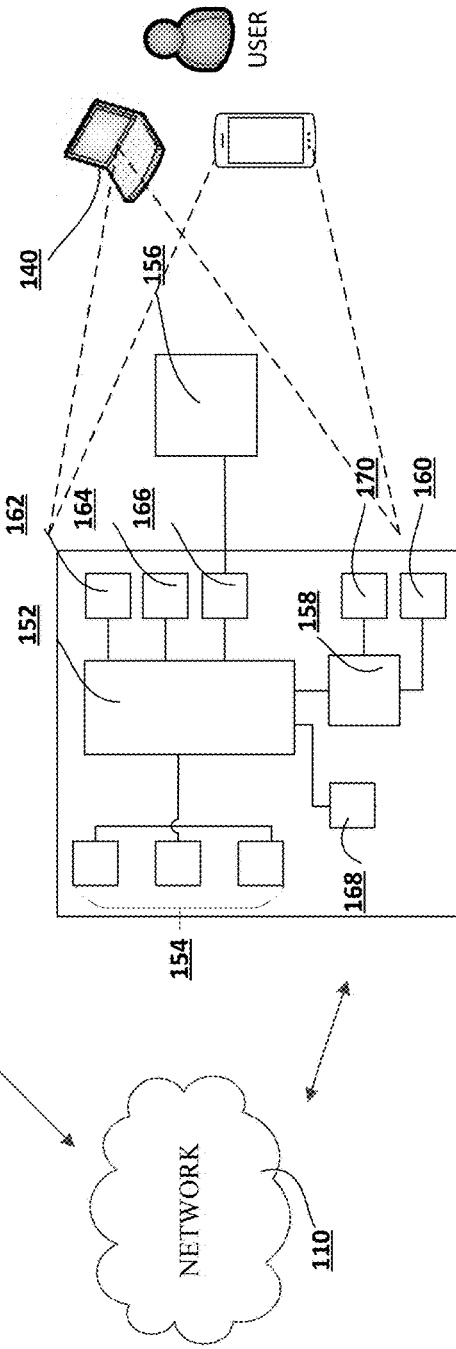
Figure 2:
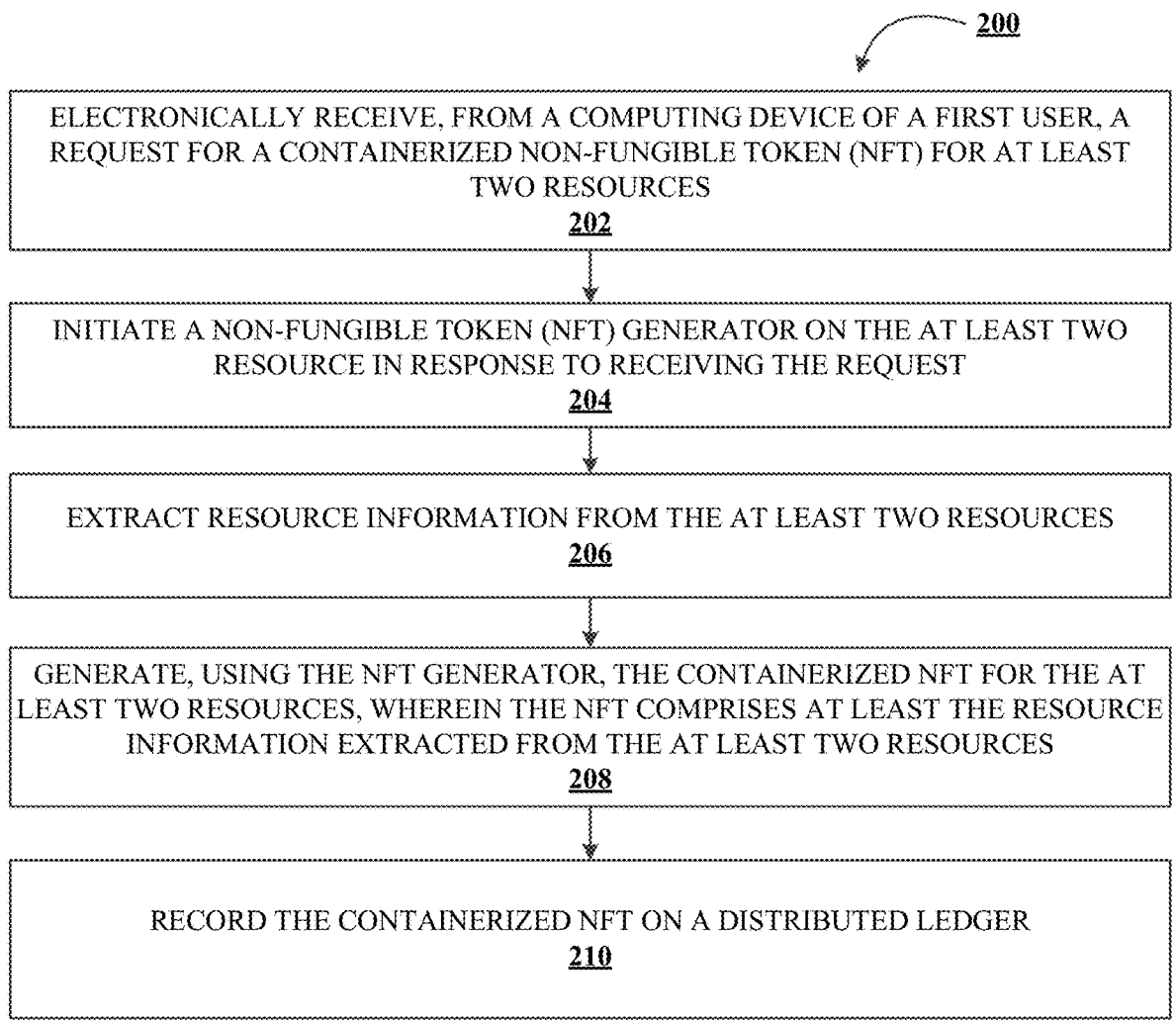
Figure 3:
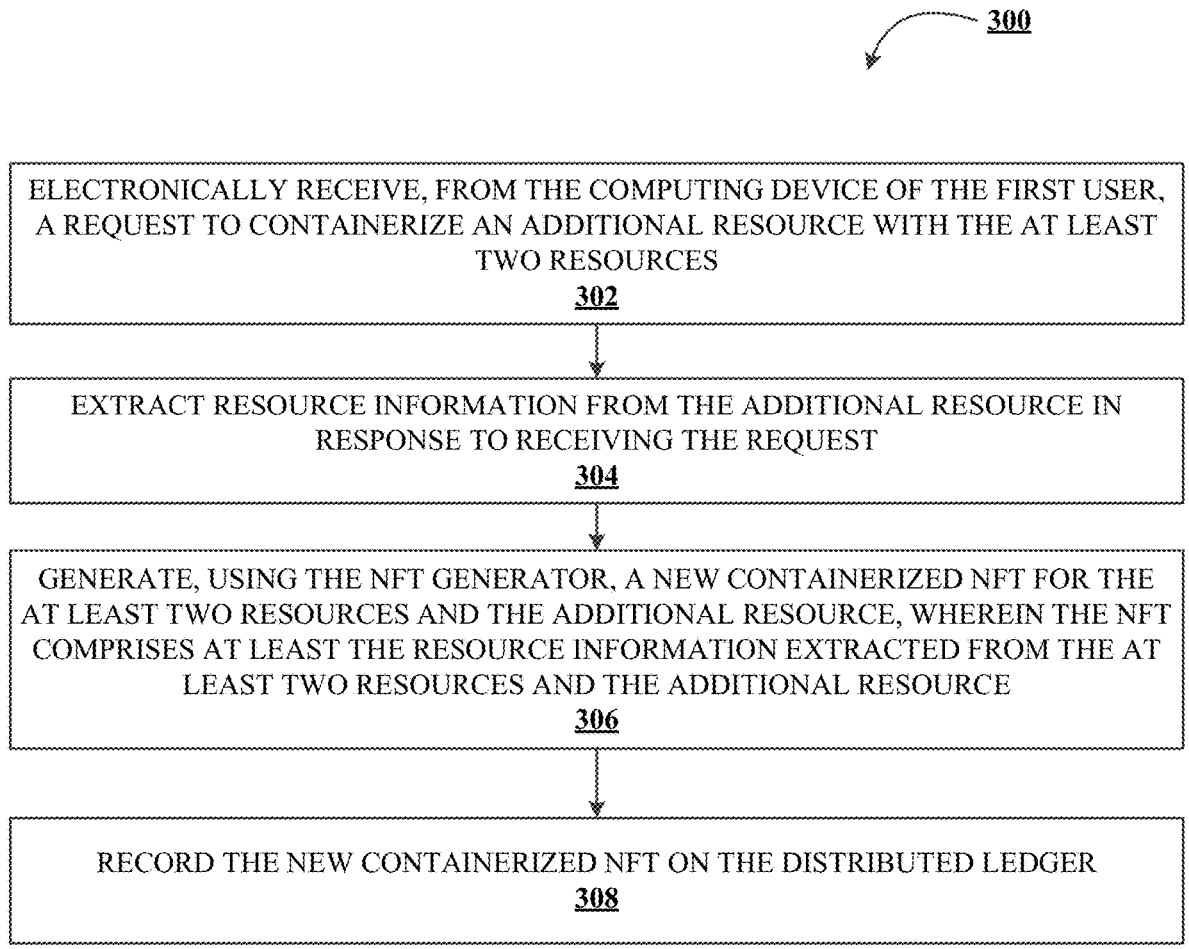

Having thus described embodiments of the invention in general terms, reference will now be made the accompanying drawings, wherein:

FIG. 1 illustrates technical components of a system for containerization of non-fungible tokens, in accordance with an embodiment of the invention;

FIG. 2 illustrates a process flow for containerization of non-fungible tokens, in accordance with an embodiment of the invention; and FIG. 3 illustrates a process flow for adding a resource to a containerized non-fungible token, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority, or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" may generally refer to objects, products, devices, goods, commodities, services, and the like, and/or the ability and opportunity to access and use the same. Some example implementations herein contemplate a market value of a property held by a user, including property that is stored and/or maintained by a third-party entity.

As used herein, a "non-fungible token" or "NFT" may refer to a digital unit of data used as a unique digital identifier for a resource. An NFT may be stored on a distributed ledger that certifies ownership and authenticity of the resource. For purposes of this invention, a distributed ledger (e.g., blockchain) may be a database that is consensually shared and synchronized across multiple sites, institutions, or geographies, accessible by multiple people. A distributed ledger may be associated with independent computers (referred to as nodes) that record, share and synchronize transactions in their respective electronic ledgers (instead of keeping data centralized as in a traditional ledger). As such, NFTs cannot be copied, substituted, or subdivided. In specific embodiments, the NFT may include at least relationship layer, a token layer, a metadata layer(s), and a licensing layer. The relationship layer may include a map of various users that are associated with the NFT and their relationship to one another. For example, if the NFT is purchased by buyer B1 from a seller S1, the relationship between B1 and S1 as a buyer-seller is recorded in the relationship layer. In another example, if the NFT is owned by O1 and the resource itself is stored in a storage facility by storage provider SP1, then the relationship between O1 and SP1 as owner-file storage provider is recorded in the relationship layer. The token layer may include a smart contract that points to a series of metadata associated with the resource, and provides information about supply, authenticity, lineage, and provenance of the resource. The metadata layer(s) may include resource descriptors that provides information about the resource itself (e.g., resource information). These resource descriptors may be stored in the same metadata layer or grouped into multiple metadata layers. The licensing layer may include any restrictions and licensing rules associated with purchase, sale, and any other types of transfer of the resource from one person to another. Those skilled in the art will appreciate that various additional layers and combinations of layers can be configured as needed without departing from the scope and spirit of the invention.

The present invention allows for containerizing a group of NFTs that may be related in some way (tied to a single resource or include multiple resources) and determines an aggregated value for that NFT container. The resulting NFT container can then be used in transactions as a single entity. NFT container can have a different owner than the owners of the individual NFT. For example, an NFT container may represent be the value of an individual's private art collection. Each piece of art may have its own NFT and the value of the individual's private art collection (NFT container) will be the aggregate value of each individual NFT. This NFT container can then be split into 100 equal shares to be sold it in the market by an entity. If a resource in the container is removed or a new resource is added to an existing container, a new NFT token is created by the system for the resulting container to replace the old one. To verify the validity of the containerized NFT at any time, the present invention may perform a checksum verification.

FIG. 1 presents an exemplary block diagram of the system environment for containerization of non-fungible tokens (NFTs) 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middle-ware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some, or all of the portions of the system 130 may be separated into two or more distinct portions.

FIG. 2 illustrates a process flow for containerization of non-fungible tokens 200, in accordance with an embodiment of the invention. As shown in block 202, the process flow includes electronically receiving, from a computing device of a first user, a request for a containerized non-fungible token (NFT) for at least two resources.

Next, as shown in block 204, the process flow includes initiating a non-fungible token (NFT) generator on the at least two resources in response to receiving the request. As will be appreciated by one of ordinary skill in the art in view of this disclosure, the NFT generator may include any hardware or software component required to create an NFT for a resource.

Next, as shown in block 206, the process flow includes extracting resource information from the at least two resources. In some embodiments, each resource may be associated with an NFT that uniquely identifies the resource and certifies ownership and authenticity. As described herein, each NFT may include metadata layer(s) configured to store resource descriptors that provides information about the resource itself (e.g., resource information) and value of the NFT. Both the resource information and the value of the NFT may be retrieved, from the metadata layers of the NFTs. The resource information may include at least resource origin information, unique attributes of the resource, and a resource value. The value of the NFT typically reflects the value of the resource. However, in some embodiments, the value of the NFT may have a value that is different than the inherent value of the resource it represents. While each resource may be associated with an inherent value, the resource origin information and the unique attributes of the resource may provide additional value add to the NFT, thus affecting its value. In one example, there may be additional value add to the resource based on who currently owns or has previously owned the resource. Assume that Buyer B1 buys a car from Seller S1, who happens to be a celebrity. S1 has an NFT for the car that they then transfer to B1 (new NFT for B1 is created, and S1's NFT pertaining to ownership is invalidated). Now, B1 not only has a car, but has a car that was previously owned by a celebrity, S1. By recording the ownership information, i.e., lineage in the NFT, the value of the NFT that B1 now holds is likely greater than what it would have been if it was an NFT for just another car in the open market.

In some embodiments, each resource may not already be associated with an NFT. In such cases, the system may be configured to extract resource information directly from the resource. As described herein, the resource information may include resource origin information, unique attributes of the resource, resource value, and/or the like. In some embodiments, the resource origin information may include information associated with any user or entity that currently owns the resource or has owned the resource at some point in the past. In another aspect, the resource information may include unique attributes associated with the resource. These unique attributes may be determined based on at least identifiable features associated with the resource. To identify the features of the resource, the system may be configured to use a resource scanner. In some embodiments, the resource scanner may be any hardware or software that is capable of analyzing a resource or environment to collect data on its shape, appearance, color, and/or the like. The collected data can then be used in data analysis to extract additional information about the resource. Based on the data collected using the resource scanner, the system may be configured to identify one or more features of the resource. The features are typically derived values (features) that are informative and non-redundant, capable of facilitating the subsequent analysis of the resource that, in some cases, may lead to better human interpretations. Examples of features may include dimensionality information of the resource, color schema of the resource, surface topography of the resource, physical density of the resource, and/or the like. Based on the identified features, the system may be configured to determine one or more unique attributes. Those skilled in the art will appreciate that the resource information may include any other significant information (e.g., how long the resource has been in existence) associated with the resource without departing from the scope and spirit of the invention. In yet another aspect, the resource information may include a resource value. Each resource may have an inherent value attached thereto whose evaluation depends on various market factors.

In some embodiments, in response to extracting resource information associated with the at least two resources, the system may be configured to generate, using the NFT generator, individual NFTs for the at least two resources. Each individual NFT may be configured to store the resource information pertaining to the resource it represents. In addition, the system may be configured to determine, using an NFT valuation engine, the value of each NFT for the resource. In response to determining the value, the system may be configured to store the value of the NFT in one of its many metadata layers.

Next, as shown in block 208, the process flow includes generating, using the NFT generator, the containerized NFT for the at least two resources, wherein the NFT comprises at least the resource information extracted from the at least two resources. In some embodiments, the containerized NFT may be a digital unit of data that includes information associated with the at least two resources aggregated into one NFT. In such cases, the many layers of the containerized NFT may include information associated with the at least two resources (e.g., resource information). In some other embodiments, the containerized NFT may be a digital unit of data that is a combination of NFTs associated with the at least two resources. In such cases, the many layers of the containerized NFT may include information about the NFTs associated with the at least two resources instead of the resources themselves (e.g., value of the NFT of each resource).

In some embodiments, in response to generating the containerized NFT, the system may be configured to determine, using an NFT valuation engine, a value for the containerized NFT. In one aspect, the value for the containerized NFT may be based on at least the resource information associated with the at least two resources. In another aspect, the value for the containerized NFT may be based on at least the value of the NFTs of the at least two resources. In either case, the value of the containerized NFT may be an aggregate of the values (of the resources themselves or the NFTs of the resources). In some embodiments, each resource may be weighted equally when determining their contributory value to the containerized NFT. In some other embodiments, each resource may be weighted unequally when determining their contributory value to the containerized NFT. In such cases, the value of the containerized NFT may be a weighted aggregate of the values of the at least two resources (or the values of the NFTs of the at least two resources).

Next, as shown in block 210, the process flow includes recording the containerized NFT on a distributed ledger. In this regard, the system may be configured to generate a new transaction object (e.g., block) for the containerized NFT. The transaction object may include the containerized NFT, a nonce—a randomly generated 32-bit whole number when the transaction object is created, and a hash value wedded to that nonce. Once generated, the containerized NFT for the at least two resources is considered signed and forever tied to its nonce and hash. Then, the system may be configured to deploy the new transaction object for the containerized NFT on the distributed ledger. In some embodiments, when new transaction object is deployed on the distributed ledger, a distributed ledger address is generated for that new transaction object, i.e., an indication of where it is located on the distributed ledger. This distributed ledger address is captured for recording purposes. In response, the system may be configured to generate a notification to be displayed on the computing device of the user indicating that the new transaction object has been created for the NFT in the distributed ledger.

In some cases, a user may want to modify contents of the containerized NFT. The user may modify the contents of the containerized NFT by either deleting a resource or substituting one resource in the containerized NFT with another. Each time the contents of the containerized NFT is modified, the system may be configured to create a new containerized NFT for the resulting container. Once created, the new containerized NFT is recorded in the distributed ledger. In some embodiments, in addition to creating the new containerized NFT, the system may be configured to record on the distributed ledger, an indication that the previous containerized NFT (pre-modification) is no longer valid.

FIG. 3 illustrates a process flow for adding a resource to a containerized non-fungible token 300, in accordance with an embodiment of the invention. As shown in block 302, the process flow includes electronically receiving, from the computing device of the first user, a request to containerize an additional resource with the at least two resources. In other words, the user may wish to include an additional resource to be containerized with the at least two resources. Next, as shown in block 304, the process flow includes extracting resource information from the additional resource in response to receiving the request. Next, as shown in block 306, the process flow includes generating, using the NFT generator, a new containerized NFT for the at least two resources and the additional resource, wherein the NFT comprises at least the resource information extracted from the at least two resources and the additional resource. Next, as shown in block 308, the process flow includes recording the new containerized NFT on the distributed ledger. In some embodiments, in response to recording the new containerized NFT, the system may be configured to transmit control signals configured to cause the computing device of the user to display the recording.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for containerization of non-fungible tokens (NFTs), the system comprising:
   at least one non-transitory storage device; and
   at least one processing device coupled to the at least one non-transitory storage device, wherein the at least one processing device is configured to:
   electronically receive, from a computing device of a first user, a request for a containerized non-fungible token (NFT) for at least two resources, wherein the at least two resources comprise NFTs associated with paintings, wherein each NFT is owned by an independent user, wherein the containerized NFT is owned by the first user;
   initiate a non-fungible token (NFT) generator on the at least two resources in response to receiving the request;
   extract resource information from the at least two resources, wherein the resource information comprises unique attributes associated with each resource, wherein extracting further comprises:
      extracting using a resource scanner, features associated with each resource, wherein the features comprise at least dimensionality information of the resource, color schema of the resource, surface topography of the resource, and physical density of the resource; and
      determining the unique attributes based on at least the extracted features;
   generate, using the NFT generator, the containerized NFT for the at least two resources, wherein the NFT comprises at least the resource information extracted from the at least two resources;
   record the containerized NFT on a distributed ledger;
   determine, using an NFT valuation engine, a value for the containerized NFT, wherein determining further comprises:
      determining a value associated with each resource, wherein the value is based on at least ownership information associated with each resource, resource origin information, resource information, and inherent resource value;
      determining a contributory value of each resource to the containerized NFT;
      determining a weight associated with each resource based on at least a contributory value of each resource to the containerized NFT; and
      determining the value for the containerized NFT based on at least a weighted aggregate of the value associated with each resource;
   divide the containerized NFT into a predetermined number of equal shares;
   determine a value for each equal share based on at least the value for the containerized NFT; and
   publish each share for sale in an NFT marketplace.

2. The system of claim 1, wherein extracting the resource information further comprises:
   retrieving an NFT associated with each of the at least two resources; and
   retrieving, from a first metadata layer of the NFT associated with each of the at least two resources, the resource information.

3. The system of claim 2, wherein the resource information comprises at least a value and ownership information associated with each of the at least two resources.

4. The system of claim 1, wherein the at least one processing device is further configured to:
   generate, using the NFT generator, a first metadata layer for the containerized NFT; and
   store the value of the containerized NFT in the first metadata layer of the containerized NFT.

5. The system of claim 1, wherein the at least one processing device is further configured to:
   electronically receive, from the computing device of the first user, a request to containerize an additional resource with the at least two resources;
   extract resource information from the additional resource in response to receiving the request;
   generate, using the NFT generator, a new containerized NFT for the at least two resources and the additional resource, wherein the NFT comprises at least the resource information extracted from the at least two resources and the additional resource; and
   record the new containerized NFT on the distributed ledger.

6. The system of claim 5, wherein extracting the resource information from the additional resource further comprises:
   retrieving an NFT associated with the additional resource; and
   retrieving, from a first metadata layer of the NFT associated with the additional resource, the resource information.

7. A computer program product for containerization of non-fungible tokens (NFTs), the computer program product comprising a non-transitory computer-readable medium comprising code causing a first apparatus to:
   electronically receive, from a computing device of a first user, a request for a containerized non-fungible token (NFT) for at least two resources, wherein the at least two resources comprise NFTs associated with paintings, wherein each NFT is owned by an independent user, wherein the containerized NFT is owned by the first user;
   initiate a non-fungible token (NFT) generator on the at least two resources in response to receiving the request;
   extract resource information from the at least two resources, wherein the resource information comprises unique attributes associated with each resource, wherein extracting further comprises:

extracting using a resource scanner, features associated with each resource, wherein the features comprise at least dimensionality information of the resource, color schema of the resource, surface topography of the resource, and physical density of the resource; and determining the unique attributes based on at least the extracted features;

generate, using the NFT generator, the containerized NFT for the at least two resources, wherein the NFT comprises at least the resource information extracted from the at least two resources;

record the containerized NFT on a distributed ledger;

determine, using an NFT valuation engine, a value for the containerized NFT, wherein determining further comprises:

determining a value associated with each resource, wherein the value is based on at least ownership information associated with each resource, resource origin information, resource information, and inherent resource value;

determining a contributory value of each resource to the containerized NFT;

determining a weight associated with each resource based on at least a contributory value of each resource to the containerized NFT; and determining the value for the containerized NFT based on at least a weighted aggregate of the value associated with each resource;

divide the containerized NFT into a predetermined number of equal shares;

determine a value for each equal share based on at least the value for the containerized NFT; and publish each share for sale in an NFT marketplace.

8. The computer program product of claim 7, wherein extracting the resource information further comprises:

retrieving an NFT associated with each of the at least two resources; and retrieving, from a first metadata layer of the NFT associated with each of the at least two resources, the resource information.

9. The computer program product of claim 8, wherein the resource information comprises at least a value and ownership information associated with each of the at least two resources.

10. The computer program product of claim 7, wherein the first apparatus is further configured to:

generate, using the NFT generator, a first metadata layer for the containerized NFT; and store the value of the containerized NFT in the first metadata layer of the containerized NFT.

11. The computer program product of claim 7, wherein the first apparatus is further configured to:

electronically receive, from the computing device of the first user, a request to containerize an additional resource with the at least two resources;

extract resource information from the additional resource in response to receiving the request;

generate, using the NFT generator, a new containerized NFT for the at least two resources and the additional resource, wherein the NFT comprises at least the resource information extracted from the at least two resources and the additional resource; and record the new containerized NFT on the distributed ledger.

12. The computer program product of claim 11, wherein extracting the resource information from the additional resource further comprises:

retrieving an NFT associated with the additional resource; and retrieving, from a first metadata layer of the NFT associated with the additional resource, the resource information.

13. A method for containerization of non-fungible tokens (NFTs), the method comprising:

electronically receiving, from a computing device of a first user, a request for a containerized non-fungible token (NFT) for at least two resources, wherein the at least two resources comprise NFTs associated with paintings, wherein each NFT is owned by an independent user, wherein the containerized NFT is owned by the first user;

initiating a non-fungible token (NFT) generator on the at least two resources in response to receiving the request;

extracting resource information from the at least two resources, wherein the resource information comprises unique attributes associated with each resource, wherein extracting further comprises:

extracting using a resource scanner, features associated with each resource, wherein the features comprise at least dimensionality information of the resource, color schema of the resource, surface topography of the resource, and physical density of the resource; and determining the unique attributes based on at least the extracted features;

generating, using the NFT generator, the containerized NFT for the at least two resources, wherein the NFT comprises at least the resource information extracted from the at least two resources;

recording the containerized NFT on a distributed ledger;

determining, using an NFT valuation engine, a value for the containerized NFT, wherein determining further comprises:

determining a value associated with each resource, wherein the value is based on at least ownership information associated with each resource, resource origin information, resource information, and inherent resource value;

determining a contributory value of each resource to the containerized NFT;

determining a weight associated with each resource based on at least a contributory value of each resource to the containerized NFT; and determining the value for the containerized NFT based on at least a weighted aggregate of the value associated with each resource;

dividing the containerized NFT into a predetermined number of equal shares;

determining a value for each equal share based on at least the value for the containerized NFT; and publishing each share for sale in an NFT marketplace.

14. The method of claim 13, wherein extracting the resource information further comprises:

retrieving an NFT associated with each of the at least two resources; and retrieving, from a first metadata layer of the NFT associated with each of the at least two resources, the resource information.

15. The method of claim 14, wherein the resource information comprises at least a value and ownership information associated with each of the at least two resources.

16. The method of claim 13, wherein the method further comprises:
- generating, using the NFT generator, a first metadata layer for the containerized NFT; and
- storing the value of the containerized NFT in the first metadata layer of the containerized NFT.

17. The method of claim 13, wherein the method further comprises:
- electronically receiving, from the computing device of the first user, a request to containerize an additional resource with the at least two resources;
- extracting resource information from the additional resource in response to receiving the request;
- generating, using the NFT generator, a new containerized NFT for the at least two resources and the additional resource, wherein the NFT comprises at least the resource information extracted from the at least two resources and the additional resource; and
- recording the new containerized NFT on the distributed ledger.

* * * * *